(12) United States Patent
Padden et al.

(10) Patent No.: US 9,546,891 B1
(45) Date of Patent: Jan. 17, 2017

(54) FLOW MEASURING SYSTEM HAVING A HOUSING WITH A FLOW MEASUREMENT DEVICE AND A DEFLECTOR PLATE ATTACHED OVER A HOLE IN A RISER

(71) Applicants: Ian Padden, Sacramento, CA (US); Tom Stockton, Penn Valley, CA (US)

(72) Inventors: Ian Padden, Sacramento, CA (US); Tom Stockton, Penn Valley, CA (US)

(*) Notice: Subject to any disclaimer, the term of this patent is extended or adjusted under 35 U.S.C. 154(b) by 0 days.

(21) Appl. No.: 15/047,313

(22) Filed: Feb. 18, 2016

(51) Int. Cl.
*G01F 5/00* (2006.01)
*G01F 15/14* (2006.01)
*E21B 47/10* (2012.01)

(52) U.S. Cl.
CPC .............. *G01F 15/14* (2013.01); *E21B 47/10* (2013.01)

(58) Field of Classification Search
None
See application file for complete search history.

(56) References Cited

U.S. PATENT DOCUMENTS

| | | | |
|---|---|---|---|
| 3,811,322 A | 5/1974 | Swenson | |
| 4,428,231 A * | 1/1984 | Peloza | G01F 1/6842 |
| | | | 73/202.5 |
| 4,454,758 A * | 6/1984 | Miller | G01F 5/005 |
| | | | 73/202 |
| 5,127,173 A * | 7/1992 | Thurston | G01F 1/3227 |
| | | | 73/202 |
| 5,168,932 A | 12/1992 | Worrall | |
| 5,333,496 A * | 8/1994 | Fenelon | G01F 15/00 |
| | | | 73/202 |
| 6,257,354 B1 | 7/2001 | Schrader | |
| 6,655,207 B1 * | 12/2003 | Speldrich | G01F 1/40 |
| | | | 73/202.5 |
| 6,886,401 B2 * | 5/2005 | Ito | G01F 1/6842 |
| | | | 73/202 |

* cited by examiner

*Primary Examiner* — Harshad R Patel
(74) *Attorney, Agent, or Firm* — Steven A. Nielsen; www.NielsenPatents.com

(57) ABSTRACT

A flow measuring system is adapted to measure flow in a sub-sea well. The flow measuring system has a housing, attached over a hole in a riser creating a fluid pathway therebetween. A deflector plate is attached to the riser and covering some of the hole. Upper vertical louvers and lower vertical louvers directly attached to the deflector plate over the hole. Apertures in the upper vertical louvers and the lower vertical louvers permit fluid to flow through. A flow measurement device is mechanically coupled to the housing and the deflector plate and configured to determine a speed and direction of flow through the fluid pathway.

10 Claims, 4 Drawing Sheets

US 9,546,891 B1

FLOW MEASURING SYSTEM HAVING A HOUSING WITH A FLOW MEASUREMENT DEVICE AND A DEFLECTOR PLATE ATTACHED OVER A HOLE IN A RISER

BACKGROUND

The embodiments herein relate generally to systems that measure flow in a sub-sea well.

Prior to embodiments of the disclosed invention, real-time accurate and positive measurement of the flow of fluids in the annulus of a wellbore, or the wellbore itself, during operations on a floating drilling or production vessel was done relative to the well bore. Some endeavors in this field include: U.S. Pat. No. 3,811,322 issued to Swenson; U.S. Pat. No. 6,257,354 issued to Schrader; and U.S. Pat. No. 5,168,932 issued to Worrall. However, Swenson, Schrader and Worrell do not teach using a propeller in a parallel flow portion of a tube to determine flow rate. Embodiments of the disclosed invention solve this problem.

SUMMARY

A flow measuring system is adapted to measure flow in a sub-sea well. The flow measuring system has a housing, attached over a hole in a riser creating a fluid pathway therebetween. A deflector plate is attached to the riser and covering some of the hole. Upper vertical louvers and lower vertical louvers directly attached to the deflector plate over the hole. Apertures in the upper vertical louvers and the lower vertical louvers permit fluid to flow through. A flow measurement device is mechanically coupled to the housing and the deflector plate and configured to determine a speed and direction of flow through the fluid pathway.

In some embodiments, a mounting bracket can be attached to the housing and the deflector plate. A propeller can be attached to the mounting bracket. A plurality of sensors can be attached to the housing and the deflector plate. Sensor cables can be attached to the plurality of sensors and a processor. The plurality of sensors monitor the speed and direction of flow through the fluid pathway which is communicated to the processor.

In some embodiments, a first mounting bracket can be attached to the housing and the deflector plate. A second mounting bracket can be attached to the housing and the deflector plate. A rotating shaft is attached to the first mounting bracket and the second mounting bracket. Helical blades are attached to the rotating shaft. A plurality of sensors can be attached to the housing and the deflector plate. Sensor cables can be attached to the plurality of sensors and a processor. The plurality of sensors monitor the speed and direction of flow through the fluid pathway which is communicated to the processor.

In some embodiments, an upper flow plate can be directly attached to the housing with a first hinge. A deflector ramp can be attached to the deflector plate. A lower flow plate can be attached to the deflector ramp with a second hinge. A plurality of sensors can be attached to the first hinge and the second hinge. Sensor cables can be attached to the plurality of sensors and a processor. The plurality of sensors can monitor the speed and direction of flow through the fluid pathway which is communicated to the processor.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
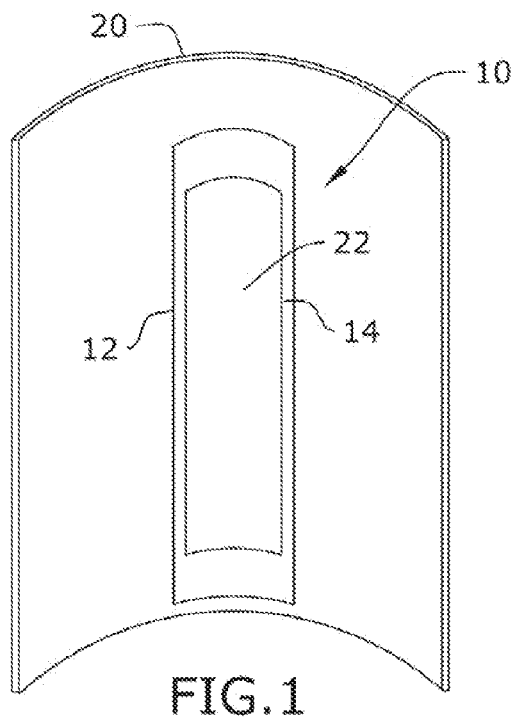
FIG. 1 shows a schematic view of one embodiment of the present invention.
Figure 2:
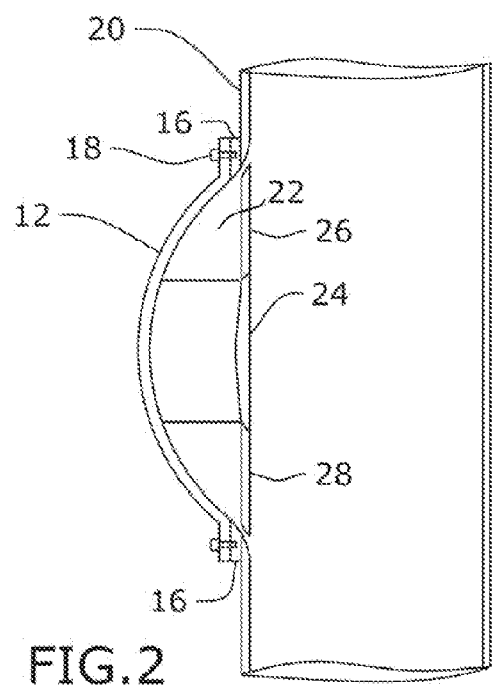
FIG. 2 shows a schematic view of one embodiment of the present invention.

By way of example, and referring to FIG. 1 and FIG. 2, flow measuring system 10 is attached to riser 20. Flow measuring system 10 further comprises housing 12 further comprising housing edge 14. Housing edge 14 is immediately adjacent to flange 16. A plurality of fasteners 18 are inserted through housing edge 14 and screw into flange 16.

Figure 3:
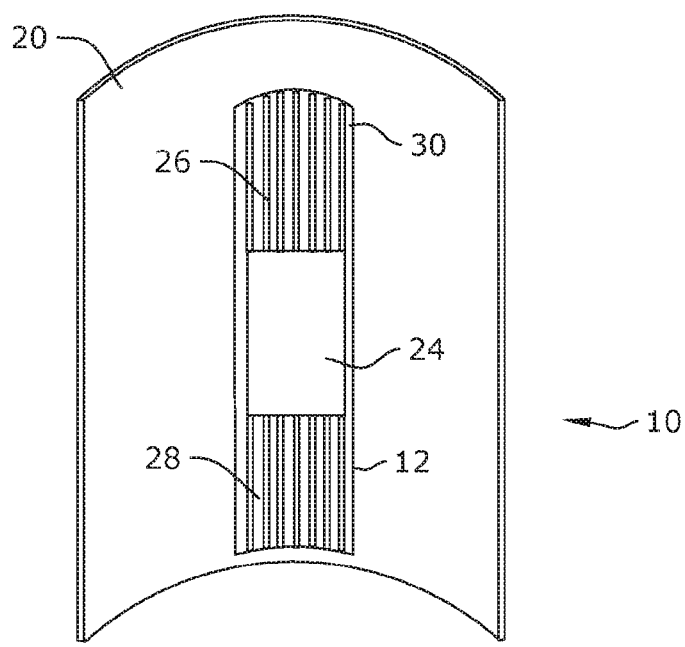
FIG. 3 shows a schematic view of one embodiment of the present invention.

Turning to FIG. 2, riser 20 further comprises hole 22. Riser 20 is mechanically coupled to deflector plate 24 which covers some of hole 22 with a fluid pathway therebetween. As shown in FIG. 3, deflector plate 24 is directly attached to upper vertical louvers 26 and lower vertical louvers 28. Apertures 30 exist between the upper vertical louvers 26 and the lower vertical louvers 28.

Figure 4:
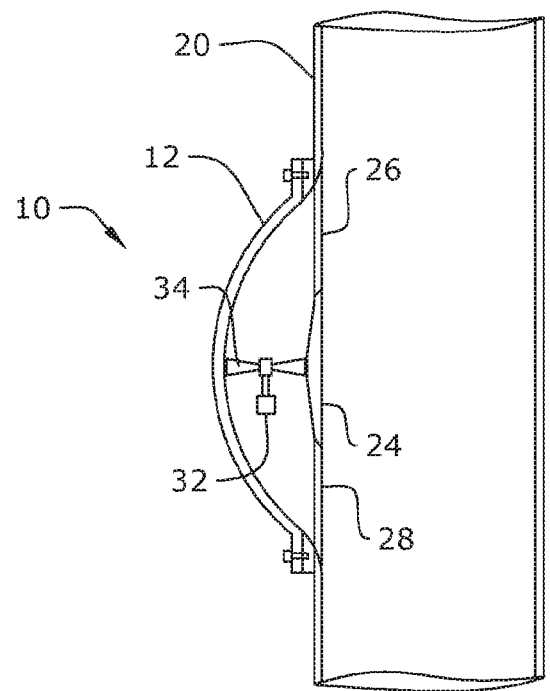
FIG. 4 shows a schematic view of one embodiment of the present invention.
Figure 5:
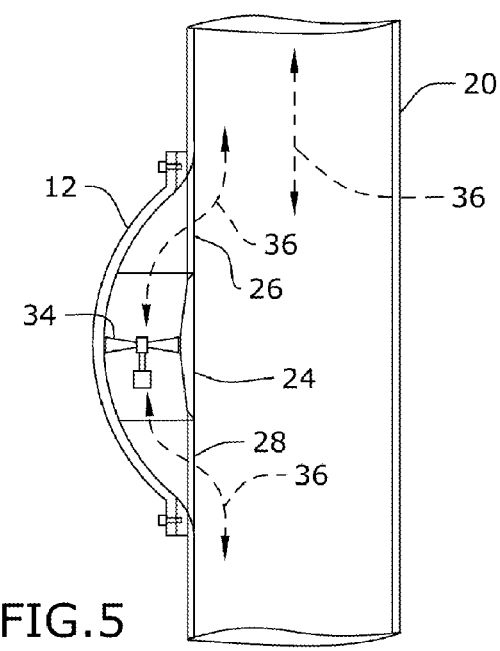
FIG. 5 shows a schematic view of one embodiment of the present invention.
Figure 6:
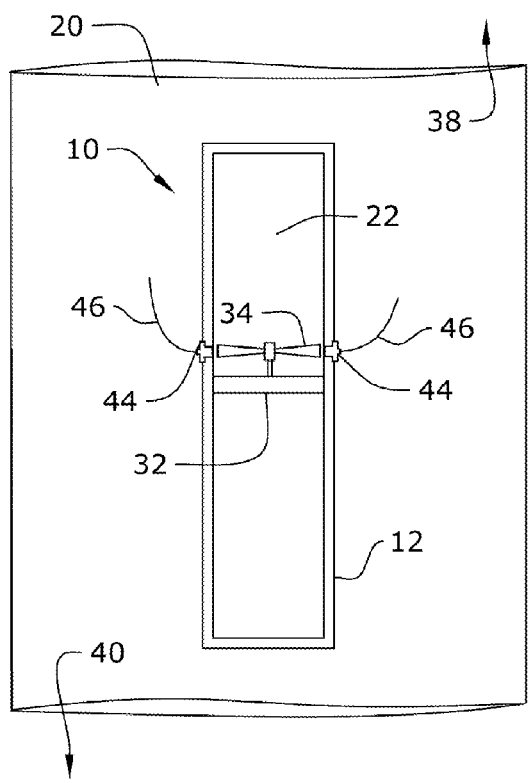
FIG. 6 shows a schematic view of one embodiment of the present invention.

FIG. 4 shows an example of a flow measurement device. Mounting bracket 32 is directly attached to housing 12. Mounting bracket 32 is a narrow bar which does not impede the flow in either direction. Mounting bracket 32 is mechanically coupled to propeller 34. Turning to FIG. 5 and FIG. 6, fluid 36 can flow either upward toward surface 38 or downward toward seafloor 40. Propeller 34 further comprises blades that are arranged in one direction such that downward flow of fluid turns the blade a first direction and upward flow of fluid turns the blades a second direction. In either direction of flow, cavity 42 exists between housing 12 and riser 20 which receives fluid flow.

In FIG. 6, at least one sensor 44 is directly attached to housing 12, two sensors 44 are shown in FIG. 6 and there can be a plurality of sensors. Each sensor 44 is electrically coupled to at least one sensor cable 46 which is further electrically coupled to a processor, most commonly located on surface 38. As propeller 34 turns, each sensor 44 determines the speed at which propeller 34 is turning as well as the direction that propeller 34 is turning. This enables the processor to determine the speed and direction of flow.

Figure 7:
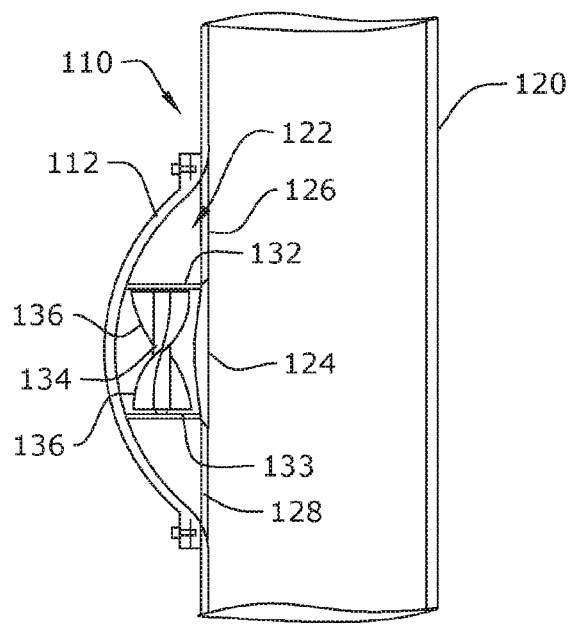
FIG. 7 shows a schematic view of one embodiment of the present invention.

FIG. 7 shows flow measuring system 110 is attached to riser 120. Flow measuring system 110 further comprises housing 112. Riser 120 is mechanically coupled to deflector plate 124 which covers some of hole 122. Deflector plate 124 is directly attached to upper vertical louvers 126 and lower vertical louvers 128. First mounting bracket 132 and second mounting bracket 133 are directly attached to housing 112 and deflector plate 124.

Rotating shaft 134 is rotatably coupled to first mounting bracket 132 and second mounting bracket 133. Rotating shaft 134 is directly attached to a plurality of helical blades 136. As rotating shaft 134 turns, sensors determines the speed at which rotating shaft 134 is turning as well as the direction that rotating shaft 134 is turning. This enables the processor to determine the speed and direction of flow.

Figure 8:
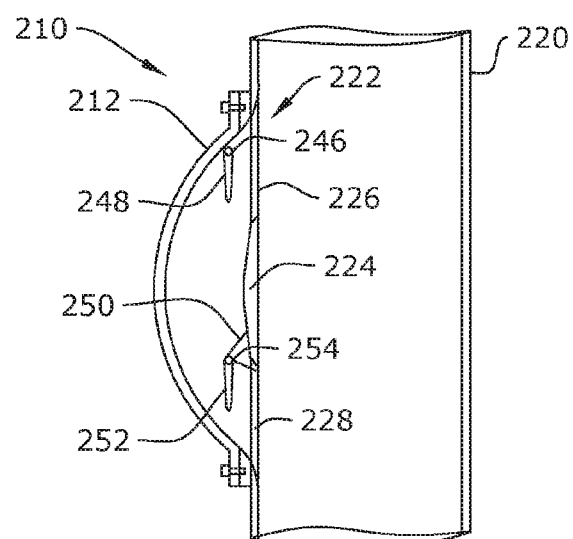
FIG. 8 shows a schematic view of one embodiment of the present invention.

FIG. 8 shows flow measuring system 210 is attached to riser 220. Flow measuring system 210 further comprises housing 212. Riser 220 is mechanically coupled to deflector plate 224 which covers some of hole 222. Deflector plate 224 is directly attached to upper vertical louvers 226 and lower vertical louvers 228. Upper flow plate 248 is directly attached to housing 212 via first hinge 246. Deflector ramp 250 is attached to deflector plate 224. Lower flow plate 252 is attached to deflector ramp 250 via second hinge 254. Flow into the housing 212 will cause the upper deflector plate 248, and lower deflector plate 252 to rotate in opposite directions and sensors attached to upper hinge shaft 246, and lower hinge shaft 254 will measure the angular position of the plates. Flow up the riser will deflect lower plate 252 inward and upper plate 248 outward toward riser 220. Flow down the riser will cause the opposite effect, upper plate 248 will move inward and lower plate 252 will move outward. The flow plate angles are signaled to the processor. The difference of a top hinge angle and a bottom hinge angle determine the speed and direction of the flow.

As used in this application, the term "a" or "an" means "at least one" or "one or more."

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. §112, ¶6. In particular, any use of "step of" in the claims is not intended to invoke the provision of 35 U.S.C. §112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A flow monitoring system (10) that detects the direction and volume of fluid flow in an offshore drilling marine riser (20); the flow monitoring system comprising:

a) an arc shaped housing (12) with the housing comprising a housing edge (14), the housing edge attached to a flange (16) and the flange attached to an opening in the offshore drilling marine riser;

b) a cavity (22) defined within the arc of the housing and in fluid communication with the opening in the offshore drilling marine riser;

c) a deflector plate (24) mechanically connected to the opening of the offshore drilling marine riser, the marine riser vertically disposed, with the deflector plate centrally disposed within the cavity over the opening in the marine riser, the deflector plate having a top side attached to upper vertical louvers (26) and the deflector plate having a bottom side attached to lower vertical louvers (28), the lower vertical louvers and the upper vertical louvers defining a plurality of linearly disposed apertures (30);

d) a fluid pathway starting within the apertures of the lower vertical louvers, continuing within the cavity and the fluid pathway continuing through the apertures of the upper vertical louvers;

e) a flow measuring device mechanically coupled to the housing and deflector plate, the flow measuring device configured to determine the direction and volume of fluid flow through the fluid pathway.

2. The flow measuring system of claim 1, wherein the flow measuring device comprises a propeller (34) disposed within the cavity and the propeller is in communication with sensors to determine the propeller's rotational speed and direction of rotation.

3. The flow measuring system of claim 2 wherein the propeller is attached to a mounting bracket (32) and the mounting bracket is disposed within the cavity.

4. The flow measuring system of claim 3 wherein the mounting bracket is further attached to the housing.

5. The flow measuring system of claim 1, wherein the flow measuring device comprises a helical screw shaft (134) disposed within the cavity and wherein the flow measuring system further includes sensors to determine the screw shaft's rotational speed and direction of rotation.

6. The flow measuring system of claim 1 wherein the flow measuring device comprises an upper flow plate (248) attached to the housing by use of a first hinge (248); and a second flow plate (252) attached to the deflector plate by use of a second hinge (254).

7. The flow measuring system of claim 1 wherein the upper vertical louvers and the lower vertical louvers are used to protect the housing and components within the housing from non-fluid objects, the non-fluid objects comprising: drilling tools, drip pipe tool joints and drilled formation cuttings.

8. The flow measuring system of claim 1 wherein the measured fluid consists of oil.

9. The flow measuring system of claim 1 wherein the housing comprises a semi-circular hydrodynamic profile to optimize fluid flow through the fluid pathway.

10. The flow measuring system of claim 1 wherein the upper vertical louvers and the lower vertical louvers are planar in shape.

* * * * *